United States Patent [19]

Faulstich

[11] Patent Number: 5,193,777
[45] Date of Patent: Mar. 16, 1993

[54] NOTE - MAP HOLDER

[76] Inventor: Eugene W. Faulstich, P.O. Box 248, Ruthven, Iowa 51358

[21] Appl. No.: 886,423

[22] Filed: May 20, 1992

[51] Int. Cl.⁵ .................................................. A47B 19/00
[52] U.S. Cl. .................................... 248/441.1; 108/44; 224/276
[58] Field of Search .................. 248/441.1, 454, 205.1, 248/447.1; 108/44; 224/276; 362/427

[56] References Cited

U.S. PATENT DOCUMENTS

| | | | |
|---|---|---|---|
| 1,573,447 | 2/1926 | Prewitt | 224/276 X |
| 1,892,721 | 1/1933 | Cardarelli | 224/276 X |
| 2,150,709 | 3/1939 | Bake | 224/276 X |
| 2,810,221 | 10/1957 | Reifsnyder | 224/276 X |
| 4,506,317 | 3/1985 | Duddy | 362/427 X |
| 4,974,805 | 12/1990 | Douglas | 248/447.1 |
| 4,995,637 | 2/1991 | Muraishi | 280/727 |
| 5,060,581 | 10/1991 | Malinski | 108/44 |

FOREIGN PATENT DOCUMENTS 3701593  8/1988  Fed. Rep. of Germany ...... 224/276

Primary Examiner—J. Franklin Foss
Attorney, Agent, or Firm—Zarley, McKee, Thomte, Voorhees & Sease

[57] ABSTRACT

A map-note holder for attachment to an automobile steering wheel. The map-note holder is a flexible, elastic support strap which can be stretched across the steering wheel and tied thereto. The map holder has a plastic means for holding a map and has a movable light means for showing light directly on the map. For storage, it can easily be removed, folded up, and stored in the glove compartment, or the like.

5 Claims, 1 Drawing Sheet

NOTE - MAP HOLDER

BACKGROUND OF THE INVENTION

The present invention relates to a note-map holder which may be removably directly to the steering wheel of any automobile or airplane. This allows for convenient holding of a map or note; and it may thereafter be easily removed, stored or transferred to another vehicle.

Clipboards and associated types of rigid structures have been used in the past in association with automobiles for holding of maps or notes. It is, however, hazardous to try to look at a road map or note while one is moving down the road. Usually this is done with the map or note either in one hand and driving with the other, or alternatively, the map or note is attached to one of the cumbersome prior art map holding devices. One of the reasons that such prior art devices have not been successfully received is that in use, especially in conjunction with a steering wheel, the vision of the instrument panel is obstructed. Moreover, the bulk of the cumbersome clipboard-type structure limits one's movements, and in fact may interfere to a certain degree with driving.

It is also true that some prior map holder devices will restrict the use of the horn, and as well restrict the use of other accessories, like cruise controls, etc. The final problems that may have contributed to the lack of success of prior art map holding devices include that generally there was no light provided for evening observation in association with the device or the light requires energy from the vehicle battery. Such devices were also bulky and not easily removed and stored in the glove compartment, purse, or the like.

It therefore can be seen that the prior art clipboard type attachments for automobile steering wheels, such as the one exemplified by U.S. Pat. No. 4,726,607, issued to White on Feb. 23, 1988, have met with a limited degree of success.

Accordingly, a primary object of the present invention is to provide a map-note holder of simple and economic construction; a map-note holder which is collapsible and therefore can be easily stored, even in a purse; a map-note holder which is easily adjustable to accommodate various diameter steering wheels; and a map-note holder which does not obstruct the vision of the instrument panel.

Another objective of the present invention is to provide a map-note holder which has an associated light means which is adjustable so that a map-note can be easily viewed, even during evening hours.

A yet further objective of the present invention is to provide a map-note holder which is flexible so that it can be easily adjusted, easily removed and stored.

Another objective of the present invention is to provide a light means which is adjustable to maximize lighting efficiency for a map-note which is in fact being held by said map-note holder.

The method and means of accomplishing each of the above objectives as well as others will become apparent from the detailed description of the invention which follows hereinafter.

SUMMARY OF THE INVENTION

A map-holder for attachment to an automobile steering wheel which comprises an elastic support strap. The strap has an associated map holding means, which are two clear plastic plates. The fastener is elastic to provide an appropriate amount of tension across the diameter of the steering wheel. In the preferred embodiment, the clear plastic plates have an associated pivotally movable flashlight means for orienting light onto the map for easy user observation.

DETAILED DESCRIPTION OF THE INVENTION

With continuing reference to the drawings, and in particular to FIGS. 1-4 thereof, the improved features of the present map holder, referred to generally as 10, will be described.

Figure 1:
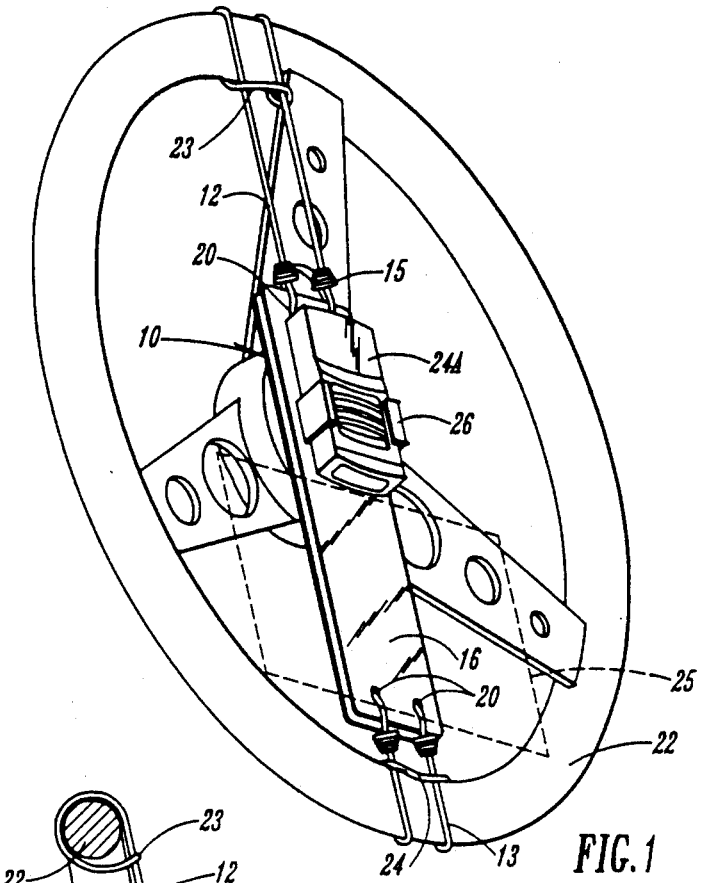
FIG. 1 is an elevated perspective view of the map-note holder of the present invention attached to the top of a wheel and showing how it may hold a map or note.
Figure 2:
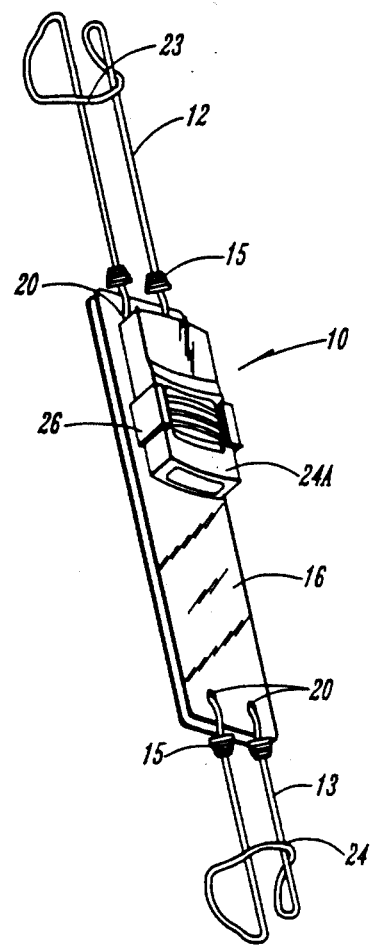
FIG. 2 is an elevated perspective view of the map-note holder.
Figure 3:
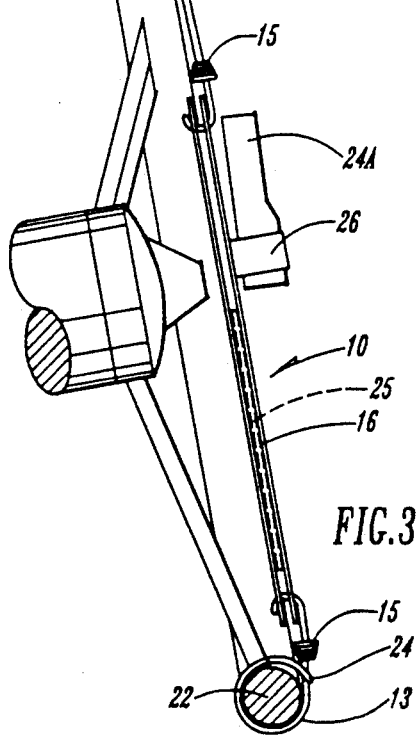
FIG. 3 shows the means of coupling the map-note holder to the opposite sides of the wheel.
Figure 4:
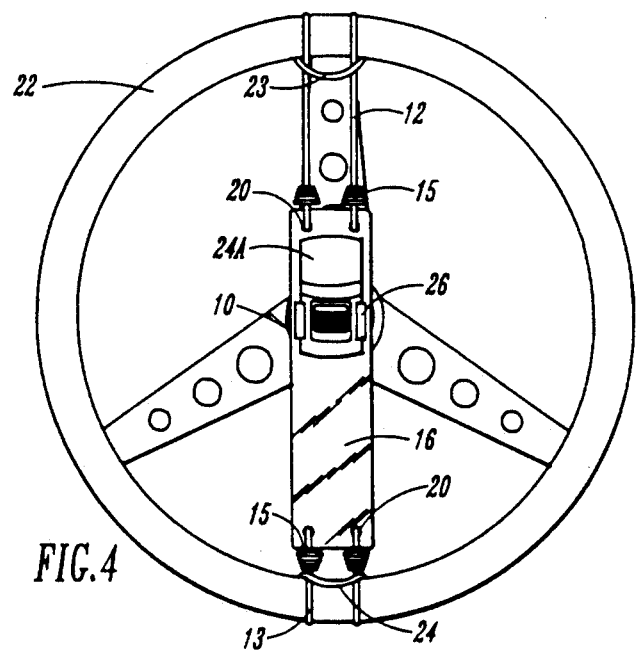
FIG. 4 shows a plan view of the map-note holder as it is attached to a steering wheel.

As best illustrated in FIGS. 1 and 2, the map holder 10 consists of four basic components. It has a pair of elastic support straps 12 and 13, with the ends having fastening hooks 15. The structure of such straps are well known, and are commercially available and need not be described in detail herein. Basically, however, support straps 12 and 13 are flexible, foldable, and stretchable or elastic in nature. Their width and length can vary, but generally they will be from ⅛ to 3/16 inch wide, and their elasticity will be sufficient to accommodate the diameter of all steering wheels 22. Support straps 12 and 13 have opposite ends attached to fastening hooks 15 which are attached to the map holder plate 16 as illustrated in FIGS. 1 and 3. Associated with the support straps 12 and 13 are transparent plastic holders 16 having holes 20. The support straps 12 and 13 are designed such that they can hook via hooks 15 or they can tie to holes 20 to plates 16 with the strap itself wrapping around the perimeter of steering wheel 22 being held in place via hooks 15 and holes 20 in plastic holders 16. After wrapping around steering wheel 22 plastic holders 16 may be pulled apart to allow insertion of map 25 between plastic holders 16.

Plastic holders 16 are held firmly in place by the tension resulting from support straps 12 and 13 being threaded through four holes 20. As depicted the upper portions of straps 12 and 13 are looped at 23 and 24 around the steering wheel and the opposite end via hooks 15 and hooked to plates 16 via spaced apart holes 20 to provide tension. Attached adjacent to the top of one plastic holder 16 is a light means 24(a). Light means 24(a) is attached by a fastener bracket 26 to plate 16 so that the light 24(a) may be swiveled or pivoted about an attachment point (not depicted), wherein the bracket 26 may be held by a fastener by way of example to orient the light in any preferred manner. Light means 24(a) is a conventional flashlight of suitable width so that it may be attached to plastic holder 16. The light means 24(a) is adjusted so that it is positioned lower (see FIG. 4) than the center of the steering wheel 22 so that it will not interfere with driving in any way.

In actual operation, the device can be used as follows. As illustrated, flexible support straps 12 and 13 can be folded, generally to the same length size of plastic holder 16. In actual use, it would remain in place, however, it could be removed from a glove compartment, purse or the like, and attached around steering wheel 22. A map 25 can then be inserted between plastic holders 16. Light 24(a) may be pivoted either to the right or to the left to provide light as desired. Bracket 26 is permanently tilted to orient light 24(a) slightly downwardly onto map 25 and may be swiveled via bracket 26 attachment point (not depicted) for lateral orientation.

It can therefore be seen that the map holder 10 is constructed such that it can be easily removed from one vehicle to another, thus saving the need for multiple map holders. Moreover, the map is located in the lower portion of the steering wheel so that it does not obstruct the view of either the instrument panel or the road. The elastic strap 12 offers no obstruction to accessories which may appear on the steering wheel, like the horn or the speed control, since the elastic is soft and offers no opposition to accessory usage. The small flashlight 24(a) fastened to the plastic holder 18 gives the necessary light for the driver to momentarily look at the map after dark. The map holder straps are designed to stretch sufficiently so as to fit all diameters of steering wheels. The plastic holder 16 does not adversely restrict the vision of the map itself.

It therefore can be seen that the invention accomplishes at least all of its stated objectives.

What is claimed is:

1. A map holder for attachment to an automobile steering wheel, comprising:
    (a) a map holder plate having opposite ends with strap fastener means associated with each end;
    (b) a flexible, elastic support strap for use with each end of said map holder to removably attach said map holder plate to a steering wheel;
    (c) a clip fastener for holding a light, pivotally attached to said map holder plate; and
    (d) a base plate located between said map holder plate and said steering wheel having a fastener means associated therewith.

2. The map holder of claim 1 wherein the map holder plate is transparent.

3. The map holder of claim 1 wherein the support straps have hook fasteners associated therewith for attachment to said map holder plate.

4. The map holder of claim 1 which includes a flashlight means associated with said plastic holder to provide a reviewing light for a map.

5. The map holder of claim 4 wherein said flashlight means is pivotally attached to said map holder plate.

* * * * *